United States Patent
Gonthier

(10) Patent No.: US 6,763,685 B1
(45) Date of Patent: Jul. 20, 2004

(54) FABRICATION OF MULTIPLEXING AND DEMULTIPLEXING SINGLE-MODE FIBER OPTIC COUPLERS

(75) Inventor: François Gonthier, Ville Mont-Royal (CA)

(73) Assignee: ITF Optical Technologies Inc., Ville St-Laurent (CA)

( * ) Notice: Subject to any disclaimer, the term of this patent is extended or adjusted under 35 U.S.C. 154(b) by 407 days.

(21) Appl. No.: 09/869,723

(22) PCT Filed: Nov. 6, 2000

(86) PCT No.: PCT/CA00/01314

§ 371 (c)(1),
(2), (4) Date: Jul. 3, 2001

(87) PCT Pub. No.: WO01/37013

PCT Pub. Date: May 25, 2001

(30) Foreign Application Priority Data

Nov. 17, 1999 (CA) .............................................. 2289962

(51) Int. Cl.[7] .......................... G02B 6/287; G02B 6/255
(52) U.S. Cl. ............................ 65/411; 65/408; 65/381; 65/406
(58) Field of Search ........................ 65/378, 406, 408, 65/409, 410, 411, 381; 385/43, 47

(56) References Cited

U.S. PATENT DOCUMENTS

| | | |
|---|---|---|
| 4,291,940 A | 9/1981 | Kawasaki et al. |
| 4,330,170 A | 5/1982 | Johnson et al. |
| 4,439,221 A | 3/1984 | Smyth et al. |
| 4,449,781 A | 5/1984 | Lightstone et al. |
| 4,586,784 A | 5/1986 | Tremblay et al. |
| 4,763,272 A * | 8/1988 | McLandrich ................ 700/117 |
| 4,763,977 A | 8/1988 | Kawasaki et al. |
| 5,054,874 A | 10/1991 | Hill et al. |
| 5,064,267 A | 11/1991 | Rossberg |
| 5,121,453 A | 6/1992 | Orazi et al. |
| 5,150,439 A * | 9/1992 | Hill et al. ...................... 385/39 |
| 5,491,764 A | 2/1996 | Hu et al. |
| 5,796,885 A * | 8/1998 | Gonthier et al. .............. 385/15 |
| 5,809,190 A | 9/1998 | Chen |
| 5,931,983 A * | 8/1999 | Bloom ........................ 65/378 |

(List continued on next page.)

FOREIGN PATENT DOCUMENTS

| | | | | |
|---|---|---|---|---|
| GB | 2220765 A * | 1/1990 | ............ | G02B/6/28 |
| WO | WO 98/13711 | 4/1998 | | |
| WO | WO 99/23518 | 5/1999 | | |
| WO | WO 200137013 A1 * | 5/2001 | ............ | G02B/6/287 |

OTHER PUBLICATIONS

Bures et al.; Analyse d'un coupleur bidirectionnel a fibres optiques monomodes fusionnées; Applied Optics; Jun. 15, 1983; vol. 22, No. 12; Optical Society of America; Montreal, Quebec.

Lawson et al.; In–Line Single–Mode Wavelength Division Multiplexer/Demultiplexer, Electronics Letters; Nov. 8, 1984; vol. 20, No. 23; Gould Research Center; Rolling Meadows, U.S.A.

Love et al.; Polarisation Modulation in Long Couplers; Electronics Letters; Jun. 6, 1985; vol. 21, No. 12; Department of Applied Mathematics; Canberra, Australia.

(List continued on next page.)

Primary Examiner—José A. Fortuna
(74) Attorney, Agent, or Firm—George J. Primak

(57) ABSTRACT

Multiplexing and demultiplexing single-mode fiber optic couplers are fabricated by aligning two single-mode fibers which have been stripped of their protective plastic jackets and cleaned so that they are held in parallel contact with each other, and then fusing these fibers to achieve a desired fusion profile and elongating the fused fibers to achieve a match point between the wavelength period and the polarization phase. The elongation process is interrupted and resumed as required to obtain a precise match point required to produce the desired multiplexing or demultiplexing coupler.

19 Claims, 9 Drawing Sheets

U.S. PATENT DOCUMENTS

| | | | | |
|---|---|---|---|---|
| 5,948,134 | A | * | 9/1999 | Bloom ........................ 65/376 |
| 6,263,128 | B1 | * | 7/2001 | Huang ........................ 385/24 |
| 6,324,322 | B1 | * | 11/2001 | Luo et al. ..................... 385/43 |
| 6,434,302 | B1 | * | 8/2002 | Fidric et al. .................. 385/43 |
| 6,498,879 | B1 | * | 12/2002 | Huang et al. ................. 385/43 |
| 2003/0031415 | A1 | * | 2/2003 | Gonthier et al. .............. 385/43 |
| 2003/0048991 | A1 | * | 3/2003 | Gonthier ..................... 385/43 |

OTHER PUBLICATIONS

Bilodeau et al.; Compact, low–loss, fused biconical taper couplers; overcoupled operation and antisymmetric super-mode cutoff; Optics Letters; Aug. 1987; vol. 12, No. 8; Optical Society of America; Ottawa, Canada.

McLandrich et al.; Polarization Independent Narrow Channel Wavelength Division Multiplexing Fiber Couplers for 1.55 µm; Journal Of Lightwave Technology; Apr. 1991; vol. 9, No. 4; San Diego, U.S.A.

Symon et al.; Dense All–Fiber WDM's by Means of Mach–Zehnder Interferometer; SPIE; Jan. 28–Feb. 2, 1996; vol. 2695; pp. 114–122; Ecole Polytechnique de Montreal; San Jose, U.S.A.

* cited by examiner

FABRICATION OF MULTIPLEXING AND DEMULTIPLEXING SINGLE-MODE FIBER OPTIC COUPLERS

BACKGROUND OF THE INVENTION

1. Field of the Invention

The invention relates to optical fiber couplers made by fusing and tapering the optical fibers and fabrication of such couplers so as to provide multiplexing and demultiplexing optical functions with minimal polarization effect. This invention also relates to the design of such couplers having predetermined wavelength periods.

2. Description of the Prior Art

Fused tapered couplers are made by laterally fusing and tapering two or more optical fibers. The technique enables an exchange of light power between two or more optical fibers and can be used to fabricate power splitters. One advantage of this method is that light never leaves the glass of the optical fiber and never encounters an interface, making the coupling process inherently reflection free.

Initially, this technique was discovered at the Canadian government communications research centre in Ottawa with reference to multimode optical fiber distribution systems, which lead to several patents, such as U.S. Pat. Nos. 4,291,940; 4,330,170; 4,439,221; 4,449,781; 4,586,784 and 4,763,977. It was soon realized that it also worked with monomode or single-mode fibers as disclosed, for example, in U.S. Pat. No. 5,054,874, but with a somewhat different behaviour.

With single-mode fibers, the coupling of light between the fibers was oscillatory, as a function of elongation, and thus the coupling ratio could be controlled. Furthermore, it was also observed that this behaviour was oscillatory in wavelength and thus the couplers could be used as wavelength multiplexers and demultiplexers as disclosed, for example, by Bures et al., Applied Optics, 1983, 22(12). In the telecommunications domain, the realization of multiplexers was published, for instance, by Lawson et al., 1984, Electronics Leters, 20(23). It was then determined that the period could be controlled by the number of coupling cycles which are observed during the elongation process. In the early 1980's, the only commercially available multiplexing fused couplers were of large periods (1300 nm–1550 nm) corresponding to 1.5 or 2 elongation cycles. However, it was later shown by Bilodeau et al., Optics Letters, 1987, 12(8), that couplers with large number of cycles had much smaller periods than those with a small number of cycles. The experimental wavelength response of long couplers shows a beating phenomenon, where the sinusoidal spectal response is modulated. This is explained by the modulation attibued to the slight difference in modal propagation constants, as disclosed, for example, by Love et al., Electronics Letters, 1985, 21(12). It became obvious then that to make a good multiplexer with a small wavelength spacing, one had to make a long coupler with many cycles and that for the multiplexed wavelengths, the two polarization states should be in phase, as shown, for instance, by McLandrich et al., Journal of Lightwave Technology, 1991, 9(4).

There are also patents that describe this principle. For example, U.S. Pat. No. 5,491,764 discloses a narrow band twisted optical fiber wavelength division multiplexer/demultiplexer (WDM) where a pair of fibers is first twisted to reduce polarization dependence and then fused to form a coupler. It is stated in this patent that although there exist fiber optic WDMs that use optical fibers which are aligned in parallel with one another and fused to form a fiber optic coupler, they are only capable of MUXing and DEMUXing two preselected wavelength lights, operating at wavelengths of 1310 nm and 1550 nm.

In U.S. Pat. No. 5,809,190 there is disclosed a multi-window wavelength-division multiplexer (MWDM) in which two fibers are crossed and fused together to form a multiplexer coupler. It is stated in this patent that it uses a crossed pair of fibers, instead of a prior art twisted pair of fibers, to improve the polarization dependent loss. By reducing the polarization sensitivity, U.S. Pat. No. 5,809,190 indicates that more than two wavelengths can be multiplexed which is obvious for sinusoidal wavelength response because such response is periodic. This principle was disclosed by Symon et al. in a paper entitled "Dense all fiber WDM by means of Mach-Zehnder interferometer" presented at SPIE Photonics West '96 conference on Functional Photonic and Fiber Devices, held in San Jose, Calif. on Jan. 28–Feb. 2, 1996 and published in the SPIE Proceedings Vol. 2695 pp. 114–122.

Neither of the above patents describes ways to achieve the correct spacing and to match the polarization phase siunultaneoasly, for any given channel spacing. Therefore, there is a need for multiplexing and demultiplexing couplers with narrow channel spacing, wherein one would simultaneously obtain a predetermined wavelength spacing and the required polarization phase match.

SUMMARY OF THE INVENTION

The present invention provides a method of fabrication of multiplexing and demultiplexing couplers with narrow channel spacing of 0.4 nm or larger by controlling the degree of fusion and the shape of the longitudinal profile of the fused fibers. This can be done without either twisting or crossing the single-mode fibers from which the couplers are made by fusion and elongation. This allows a more precise control of the response of the coupler and makes it possible to achieve a match between spacing and polarization for any given channel spacing, that will be reproducible in fabrication. This is possible because the control can be used to reduce or increase polarization dependence and wavelength dependence so that the match can be made for any desired condition. The invention also includes the novel couplers produced pursuant to the new fabrication process.

The principle of operation of single-mode fused fiber couplers is now well known. For simplicity, we will only describe the operation of a 2×2 coupler, i.e., a coupler composed of 2 fused single-mode identical fibers. Although the basic principle presented here is applicable to other fused structures, using more than 2 fibers or dissimilar fibers, most of the discussion herein is oriented towards making a 4 port-device, i.e., 2 input ports and 2 output ports, that can multiplex or demultiplex two series of wavelengths.

In making a 2×2 single-mode fused fiber coupler, two optical fibers are placed side-by-side after stripping of the protective polymer jacket, so that the optical claddings of the fibers are longitudinally in contact over a predetermined length. Such contact can be mechanically maintained or, as indicated in some prior art references mentioned above, the fibers can be crossed or twisted together. The exposed section is placed between two holding clamps that suspend it so that a heat source can be approached to fuse and soften the glass, and to create taper by pulling on the clamps. This creates a bi-taper structure, made of two fibers that share a single optical cladding because they are fused together. If the taper transverse dimensions are small enough, the fiber cores are reduced to a point where they do not guide the light anymore. This power is then guided by the optical cladding and the surrounding medium, which is usually air, thus forming a highly multimode waveguide.

Because of the transverse symmetry of the structure, composed of two fused identical fibers, the single-mode fiber core mode excites, in the down-taper region, a superposition of two optical modes of the fused and tapered region. These modes, hereafter called supermodes, are the fundamental mode, labelled $LP_{01}$ and the first asymmetric mode, labelled $LP_{11}$. If the transition in the down taper region is adiabatic. i.e. the taper slope is not too abrupt, the two supermodes are exited equally and no power is lost to higher power modes. The two supermodes then propagate along the fused section, accumulating a phase difference $\phi$. In such adiabatic up-taper region, the supermodes interfere and the power goes back into the fiber cores. Depending on the phase however, the interference will be either constructive in the initial fiber core or if the modes are out of phase, in the secondary fiber core, thus transferring the power from one fiber to the other. The transmission of a coupler of length L can be described by a transfer matrix $T(\phi)$, $$\begin{pmatrix} a_1(L) \\ a_2(L) \end{pmatrix} = T(\varphi) \begin{pmatrix} a_1(0) \\ a_2(0) \end{pmatrix} = e^{i\overline{\varphi}} \begin{pmatrix} \cos\varphi & i\sin\varphi \\ i\sin\varphi & \cos\varphi \end{pmatrix} \begin{pmatrix} a_1(0) \\ a_2(0) \end{pmatrix}$$

where $\alpha_1$ and $\alpha_2$ are the optical amplitudes in the first and second fiber respectively at the input of the coupler ($\alpha_1(0)$) and at the output of the coupler ($\alpha_1(L)$), where the accumulated phases are defined as $$\varphi = \int_0^L \frac{B_1 - B_2}{2} dz$$

and $$\overline{\varphi} = \int_0^L \frac{B_1 + B_2}{2} dz$$

The phases are integral over the length L (along the propagation axis z) because the longitudinal profile of a tapered coupler varies along L, i.e., the transverse dimensions are tapered down then up, and the propagation constant of the supermodes $B_1$ and $B_6$ for the supermode $LP_{01}$ and the supermode $LP_{11}$ respectively depends on the local transverse dimension.

This transmission of a coupler, for an input in one of the branches ($\alpha_1(0)=1$, $\alpha_2(0)=0$) is thus given by $$P_1 = \cos^2(\phi)$$

$$P_2 = \sin^2(\phi)$$

where $P_1$ and $P_2$ is the output optical power in the first fiber and second fiber respectively.

The oscillatory behaviour of a 2×2 coupler thus depends only on the accumulated phase difference $\phi$. When one elongates a coupler, one obverses an oscillatory behaviour. This is due to the phase difference $\phi$ being increased as the length L of the coupler increases. When a coupler is measured in wavelength, one can also notice this oscillatory behaviour, because the phase difference $\phi$ also increases approximately linearly with wavelength. Furthermore, when couplers are elongated several cycles, a beating phenomenon is observed in the cycles if an unpolarized light source is used. This effect is due to the birefringence of the coupler. One can define two orthogonal axes of polarization, which are the two axes of symmetry of the coupler, defined here as x-axis and y-axis. For each as, there are 2 supermodes, $LP_{01}^x$, $LP_{11}^x$, and $LP_{01}^y$, $LP_{11}^y$. If each polarization is independent of the other, i.e., if they are not coupled in the coupler, the transmission can be written for each polarization as follows:

$$P_1^x = \cos^2(\phi_x)$$

$$P_1^x = \sin^2(\phi)$$

$$P_1^y = \cos^2(\phi_y)$$

$$P_2^y = \sin^2(\phi^y)$$

where $\phi_x$ and $\phi_y$ are the accumulated phase differences of the two polarization states. The total output power for all states of polarization can thus be written as follows.

$$P_1 = (\alpha_1^x(0))^2 P_1^x(\phi_x) + (\alpha_1^y(0))^2 P_1^y(\phi_y)$$

$$P_2 = (\alpha_2^x(0))^2 P_2^x(\phi_x) + (\alpha_2^y(0))^2 P_1^y(\phi_y)$$

where $\alpha_1^x(0)$ and $\alpha_1^y(0)$ are the amplitudes of each polarization state at the input of the coupler. For normalized power input, $(\alpha_1^x(0))^2 + (\alpha_1^y(0))^2 = 1$.

The resulting output is thus a modulated sinusoidal response, the modulation amplitude being determined by the ratio of the initial polarization amplitude. When monitored with an unpolarized light source, the modulation amplitude is maximum because both states of polarization are excited with equal amplitude. The transmission thus becomes represented as follows:

$$P = 1/2(P_1^x(\phi_x) + P_1^y(\phi_y))$$

$$P_2 = 1/2(P_2^x(\phi_x) + P_2^y(\phi_y))$$

As a function of elongation or wavelength, the measured response of a coupler with an unpolarized source will show a rapid power oscillation between the two output ports, the amplitude of which is modulated, i.e., for which the contrast varies from 0 to 1. In this modulated oscillation, when the amplitude is maximum, i.e., when there is a complete power exchange between the two ports, the polarization phases $\phi_x$ and $\phi_y$ are matched, i.e. their difference is a multiple of $2\pi$. When the contrast is 0, i.e., when the rapid oscillation amplitude almost disappears, the power is divided 50% /50% between the ports, and the polarization phases are out of phase by $\pi$. Therefore, to make a good multiplexer/demultiplexer, one has to match both polarization phases, so that the amplitude of the power exchange is maximum whatever the state of polarization.

According to this invention, in order to match the two polarization states at a given wavelength spacing, the parameters that change the fused fiber transverse and longitudinal shape must be controlled. These parameters relate to the local cross-sections of the fused fibers and include the degree of fusion between the fibers and the reduction ratio defined as the reduced cross section dimension/initial dimension before tapering. Their value varies with the tapered structure, i.e. with the longitudinal profile, including both the variation of degree of fusion and of reduction ratio.

Accordingly, one of the objects of this invention is to control the phase of the two polarization states. However, such control would be difficult if there was a coupling between the polarization states. Thus, it is a preferred feature of this invention to keep the fibers of the coupler in parallel alignment, i.e. untwisted and uncrossed, during fusing. In such a fused fiber coupler, the two polarization states do not couple and therefore provide no uncertainty in the process arising due to coupling that may occur with twisted or crossed fibers. Furthermore, it is difficult to measure parameters such as the degree of fusion, when the fibers are twisted or crossed, making the control of such parameters more difficult. Nonetheless, the invention may also be applied to couplers with twisted or crossed fibers, although with greater difficulty of control.

It is also an object of this invention to teach how to change the degree of fusion and longitudinal profile in order to obtain the matching of the polarization phases at a given wavelength separation.

It is a further object of this invention to provide a matching which does not result in a unique profile, but rather several profiles may produce such a matching because the process is periodic in nature. The choice of the matching point will depend on the restriction in length that might be imposed on the coupler design due to a packaging size limitation, or the desire to me the polarization effect for more than two wavelengths.

In order to understand how to achieve the polarization phase matching, one has to understand how the wavelength response of a coupler is influenced by its degree of fusion and reduction ratios.

The degree of fusion is a measure of the shape of the cross-section of the fused coupler. By definition, it varies from 0, when the fibers are barely touching each other to 1 when the two fibers are completely fused, making the cladding of the fused structure cylindrical in form. There is a direct relation between the degree of fusion and the distance between the fiber cores, which are closest when the degree of fusion is 1.

The reduction ratio is the measure of the taper profile. It is the scaling factor of the cross-section as the taper is made. It is assumed that when the fibers are tapered, the reduction in size is always proportional for both x and y axes.

Both parameters will influence the local difference of the supermodes propagation constants $\Delta\beta = B_1 - B_2$. At a given wavelength, for a given degree of fusion, $\Delta\beta$ will increase as the taper size is reduced. For a given reduction ratio, $\alpha\beta$ will also increase if the degree of fusion is increased.

The effect of these parameters on the wavelength dependence is more complex. First, for a given degree of fusion and reduction ratio, $\Delta\beta$ increases with wavelength. Thus, the accumulated phase $\phi$ of a coupler of length L also increases with wavelength, thus giving the coupler its oscillatory wavelength response. However, the wavelength period will depend on the slope $d\phi/d\lambda$ of the phase. Thus, for a given degree of fusion and reduction ratio, an increase in the length L will reduce the wavelength period. That is why longer couplers have narrower wavelength response. Furthermore, for a given length L and a given degree of fusion, a coupler with a smaller cross-section (a smaller reduction ratio) will also have a smaller wavelength period. However, for a given length and a given reduction ratio, a greater degree of fusion will increase the wavelength period.

Thus, all these parameters influence the wavelength period of a coupler. The actual coupler is even more complex because the phase is an integral over the longitudinal profile of length L of all the different $\Delta\beta$ given by the local fusions and reduction ratios. Because of this, however, it is possible to modify the profile of a coupler to change its properties.

For example, when a coupler is made, one can monitor the elongation oscillatory response. When monitoring at wavelength $\lambda_1$, the response is periodically maximum. If one stops at the Nth maximum, and looks at the wavelength spectrum. One will see a given wavelength period, thus creating a multiplexer between $\lambda_1$ and $\lambda_2$, with a channel spacing of $\delta\lambda_2 = \lambda_1 - \lambda_2$. If one continues the elongation to the next maximum at $\lambda_1$, one will increase the phase, and thus decrease the wavelength period, thereby creating a multiplexer between $\lambda_1$ and $\lambda_3$ with a channel spacing of $\delta\lambda_3 = \lambda_1 - \lambda_3 < \delta\lambda_2$. This allows to make a multiplexer with different spacings. However this spacing, at a given wavelength, is discrete. Varying the degree of fusion or the longitudinal profile will help change these discrete points so as to match the spacing with the maximum at a given wavelength. For example, if one wants $\delta\lambda_{2>\delta\lambda_2.} > \delta\lambda_3$, one can either increase the size of the cross-section by using a wider heat source or by increasing the fusion This will shift $\delta\lambda_2$ towards 67 $\lambda_2$. Or if one decreases the size of the cross-section or decreases the fusion, one will shift $\delta\lambda_3$ towards $\delta\lambda_2$. These two parameters can be controlled in a continuous fashion, thus making it possible to match any wavelength period at any wavelength.

According to this invention, it is possible to use the same principle as explained above to match the wavelength periods and the polarization phase at the same time, since the same reasoning can be applied to the polarization phase matching.

Thus, it is first necessary to look at the influence of the fusion and ratio parameters on the polarization phases. Except in the case of extremely lightly fused couplers, the two polarization phases are almost equal for couplers with full cross-section dimensions and their difference increases as these dimensions get smaller. However, this dependence is not proportional to the degree of fusion, being largest for a degree of fusion close to 0, minimum at a value between 0.4 and 0.7, and slightly larger for a degree of fusion of 1.

As a function of the reduction ratio, the smaller the coupler, the greater the difference between the two polarization phases. And the increase is exponential with the size. This is due to the supermode fields which are larger at the cladding-air interface and the large index step has a large influence on the x- and y-polarization difference.

As with the supermode phases $\phi_x$ and $\phi_y$, the polarization phase difference $\phi_{xy}$ also accumulates a phase difference along the coupler. Because both are positive and of a small order of magnitude, the phase difference $\phi_{xy}$ is smaller than either $\phi_x$ or $\phi_{xy}$. That essentially means that, as a function of elongation when monitored with an unpolarized light source, the coupler wall go through many power exchange cycles before $\phi_{xy}$ is equal to $\pi$, which corresponds a null point in the contrast or $2\pi$ for the first maximum contrast point, i.e. the polarization phase matching point. It is close to the points where $\phi_{xy}$ is a multiple of $2\pi$, that the multiplexing coupler should operate, the polarization beating phenomenon being also a function of wavelength.

Thus, when a coupler is elongated, power cycles can be monitored and elongation can be stopped when the first polarization phase $\phi_{xy}$ match point is reached. Then, if measured as a function of wavelength, one will observe a maximum contrast at the monitoring wavelength, contrast which will decrease as one looks further away from the monitoring wavelength. If one looks at the difference between the first maximum and the first minimum on either side of the monitoring wavelength, one will get the channel spacing of this particular multiplexing coupler. If the elongation is continued to the next polarization phase match point, the wavelength period will be smaller One can continue elongation to the next phase matching point to obtain again a smaller period, and so on. As with the multiplexer phase itself, these points are discrete points that have specific wavelength periods. If these periods do not correspond to the desired period, one can adjust the phase wavelength slope dφ/dλ so that the phase matching point also matches the desired period. One can adjust the fusion or the longitudinal profile to achieve this match.

If the phase matching point period of the closest phase matching point is smaller than the desired period, it means that the coupler is not polarization dependent enough. This can be corrected by creating a profile with a smaller waist which will increase the polarization dependence. The phase match point will occur sooner in elongation and thus will be smaller, while the corresponding period will be larger. With a good control of the coupler parameter, it can be made to match the desired period. When the period is so matched, a small adjustment in the length may be needed so as to match the maximum and minimum with the appropriate wavelength. When the number of cycles is large, the first polarization phase match point occurs only after many cycles, and the period does not significantly change with a shift of a fraction of the period; thus the adjustment can be made without changing the period. This is not true, however, for a coupler with only a few cycles, where the profile has to be changed in order to make the period and the wavelength match. Inversely, if the phase matching point period of the closest phase matching point is larger than the desired period, then one has to make the profile waist larger to reduce the polarization dependence. This will make the coupler length longer, but it will be possible to phase match both the polarization and the period.

It is important to note that the phase match can be realized by changing the degree of fusion rather than the profile, or a combination of both. The effect of changing the degree of fusion can be significant. For a given profile, it is possible to make the first polarization match point period using a degree of fusion of 0.4 equal to the second polarization match point period of a coupler that has a 0.1 degree of fusion.

Thus, according to this invention, it is possible to control the polarization phase match point period of the couplers by controlling both the degree of fusion, i.e. the cross-section of the coupler, and the shape of the longitudinal profile, by varying the heat source position and/or shape and the speed of elongation.

Because of the sensitivity of both the fusion parameter and the longitudinal profile, and because the method to obtain the appropriate wavelengths and periods is iterative, i.e., a coupler has to be made, measured and the fabrication parameters have to be modified to make the next attempt closer to the goal, the fabrication process must be repeatable. This is why it is necessary to separate the steps of fusing the fibers and elongating the structure, so that the degree of fusion may be made reproducibly and measured.

It is thus part of the process of this invention to fuse the coupler in a separate step before proceeding with the elongation and tapering of the fused fibers. Furthermore, the fusion step can be realized with a different heat source than the elongation and tapering step. To decrease the time of fusion, another torch tip, creating a hotter flame, can be used to fuse the fibers. Also, the flame is preferably approached from the side, so that the gas flow from the torch tends to push the fibers together, facilitating the fusion process. The heat source is swept along the fusion region, spending more time in the middle of the fused region, to create a gradual variation in the degree of fusion so that no loss is induced in the optical power transmission during and after fusion and during and after tapering.

It is a feature of the method of this invention to achieve the polarization phase matching period by iteratively adjusting the longitudinal profile and the degree of fusion. This is realized by changing the heat source position and/or shape and the speed of elongation. Once the general properties of a multiplexer are thus achieved, one can go to more detailed optimization.

The important parameters of the multiplexers and demultiplexers will now be described in greater detail.

A multiplexing coupler has 3 ports that are used. There are two input ports where the different wavelengths are inserted and combine in the output port. The important optical parameters describing a multiplexing coupler are the insertion loss of each wavelength going through the devices. Ideally, the insertion loss should be 0 dB (corresponding to a normalized transmission of 1, i.e., a lossless device). For a demultiplexing coupler (which is exactly the same thing as a multiplexing coupler but used in reverse), the combined wavelengths are inserted in the single input port and are separated in each of the two output ports. In this case an additional important parameter is the isolation of the wavelengths, meaning the amount of power at a given wavelength, which is present in the other port with the other wavelength. The isolation should be as large as possible because the different wavelengths and thus the different signals will otherwise interfere at the output detector and thus cause errors, and any wavelength which is not in the appropriate port is lost for the transmitted signal. In both the multiplexer and demultiplexer, one other important parameter is the passband, i.e., the wavelength band around the desired wavelengths within which the device keeps certain properties, i.e., a given insertion loss or isolation. The simplest application of a multiplexing coupler is to multiplex or demultiplex two wavelengths.

In a polarization phase cycle, the polarization phase match point occurs at one wavelength $\lambda_p$. It is only at this wavelength in the polarization cycle that the transmission of the coupler is independent of polarization. The phase mismatch increases as one moves away from this wavelength. However, even with a mismatch, there is a point in each transmission halfcycle, where the output power is polarization independent because, at the transmission extremum of an unpolarized wavelength response $P_x=P_y$. The coupling ratio of this minimum dependence does however depend on the local value of the phase mismatch, and if this phase mismatch is large, the local cost will not be good. To minimize the polarization effect, one has to design the profile so that $\lambda_1 < \lambda_p < \lambda_2$, $\lambda_1$ and $\lambda_2$ being the two wavelengths to be multiplexed. Ideally $\lambda_p=(\lambda_1+\lambda_2)/2$. Being close to the polarization phase match point will insure a good isolation at both wavelengths. However, if one goes further away from this point, i.e., looking at the second, third, etc. extremum, the isolation will decrease and the insertion loss will increase. Though the multiplexer or demultiplexer may function, it will not be the optimum situation. The condition where the polarization phase match point is exactly in the middle of the two multiplexed wavelengths corresponds to a symmetry in the wavelength signal when, at both multiplexed wavelengths, the isolation and insertion loss are the same. If the $\lambda_1=\lambda_p$, the isolation would be greatest at that wavelength and less at $\lambda_2$, because the polarization phase mismatch is larger.

To achieve this condition, one can carefully tailor the coupler cross-section and longitudinal profile, but it is difficult to always match the polarization phase match point and the mid-point wavelength of the wavelength period. It was found, and it is a feature of this invention, that whereas heating and elongating the coupler increases all phases $\phi_x$, $\phi_y$, and $\phi_{xy}$, making a small mechanical elongation without a heat source, herein referred to as "cold-pull", increases the polarization phases $\phi_x$ and $\phi_y$, but decreases, $\phi_{xy}$. This effect can be used to opt the phase match in order to obtain a symmetrical isolation response between the two multiplexed wavelengths.

The precision in the centering of the channel can be obtained by small pulling adjustments which consist simply in stopping the elongation process and removing the heat source, at a point where the exact period and wavelengths are not yet reached, then monitoring the wavelength response. Thereafter, one reheats and pulls slightly in a very controlled manner, for a controlled time or distance and immediately removes the heat source. This will cause the coupler wavelength response to evolve in a very gradual and controlled manner, making it possible to target very precisely the wavelengths. Because the polarization phase effect of the cold pull can be very well calibrated, it is always possible to slightly overshoot the polarization phase match point and then bring it back with a cold-pull, so as to simultaneously match the multiplexed wavelengths with symmetry extremums in isolation.

It is part of the method of this invention to adjust the final coupler properties using the short heated controlled pulls and the final cold pull.

With such good control tools within the fabrication process, the design becomes very flexible and several applications can be optimized, such as applications involving several wavelengths, applications involving very narrow spacing (e.g. 1.6 nm channel spacing) and applications involving large wavelength spacing (30 nm to 70 nm).

As mentioned above, one can use more than one extremum away from the polarization phase matching point, but in such cases the performance may not be optimum. It may however by acceptable, so that the coupler could be used for more than two wavelengths, if such wavelengths stand on an approximately equally spaced grid. The optimization is similar as for the two wavelength multiplexer, except that the polarization phase match wavelength must be placed at $\lambda_p=(\lambda_1+\lambda_n)/2$, $\lambda_p$ being the longest wavelength of the multiplexed series with $\lambda_1$ being the shortest. In this scheme the odd numbered wavelengths are multiplexed to the even numbered wavelengths. In the demultiplexer, a series of wavelengths separated by $\delta\lambda$ will be demultiplexed into two series of wavelengths separated by $2\ \delta\lambda$. The centering technique is identical as for the two wavelength multiplexer. However, if one wants to optimize the performance of the device, one must try to reduce the polarization dependence so as to decrease the polarization phase mismatch within the wavelength range $\lambda_1$ to $\lambda_n$. This can be done by using a strong degree of fusion and a large cross-section profile. In this case, the polarization phase match occurs at a small number of polarization cycles, which makes the polarization phase difference slope smaller. This, however, will make the coupler physically longer. Thus, the method for producing such coupler is limited by the maximum length admissible for the packaging of the device.

It is, therefore, a feature of this invention to achieve a multi-wavelength operation of the multiplexers and demultiplexers by properly centering the polarization phase match point and reducing the polarization sensitivity by the control of the fusion and elongation profile of the coupler. This multi-wavelength operation is possible for a very narrow spacing (1.6 nm), but is more limited by polarization than for larger spacing because the polarization phase slope is much larger with the narrow spacing. For a large spacing (e.g. 10 nm) operation, over 8 wavelengths is possible as opposed to 4 for 1.6 nm spacing, with the same isolation criteria.

For very small channel spacing such as 1.6 nm, the number of power cycles is very large (>400) and the number of polarization cycles is also large (>30). This means that the period at each polarization cycle changes just a little. It is thus easier to achieve the proper period match than for larger periods, because of the discrete step in the period of the polarization cycles. Because of the adjustment possible with the fusion parameter and the longitudinal profile, it is possible to match the polarization phase of any period. This applies for any period that can be achieved after the first polarization phase match point in elongation. Depending on the profile, the channel separation is usually between 25 and 10 nm at this first polarization phase match point. It is thus possible to easily match any channel spacing, from 30 nm to 1 nm, by increasing or decreasing the polarization dependence using the degree of fusion parameter or the profile parameter. However, for spacing of about 30 nm, this is more difficult because the first polarization phase match point has not been reached during elongation and the zero point can not be moved. To make multiplexers with wavelength spacing of 30 nm and above, one must either greatly increase the polarization sensitivity or greatly decrease it.

For spacings above 60 nm, the solution, which is part of this invention, is to decrease the polarization sensitivity by using a strong fusion and a very long longitudinal profile. This solution does not place a polarization match point between the target wavelengths, but it minimizes the polarization mismatch. One could extend this solution to spacing below 60 nm, but the coupler usually becomes to long for it to be practical. The other solution is to make the coupler very polarization sensitive by moving the first polarization phase match point period up to the desired value between 30 and 60 nm. This requires a very small degree of fusion and an abrupt longitudinal profile. Because this produces an increase in polarization dependence, it will limit the operation of the device in a multi-wavelength configuration.

Thus, it is a feature of this invention to realize large period multiplexers using the long profile approach for larger spacings and using a profile with small fusion and size to realise raid-spacing multiplexers.

BRIEF DESCRIPTION OF THE DRAWINGS

A preferred embodiment of the invention will now be described with reference to the appended drawings in which.

DETAILED DESCRIPTION OF THE INVENTION

The invention will now be described by way of preferred, non-limitative embodiments which will describe multiplexers and demultiplexers operating in the 1200 to 1700 nm range, with some examples operating in the 850 to 1300 nm range. The method used to fabricate such couplers is general in nature and can be adapted to other ranges and can be used with fibers other than those mentioned herein.

Figure 1:
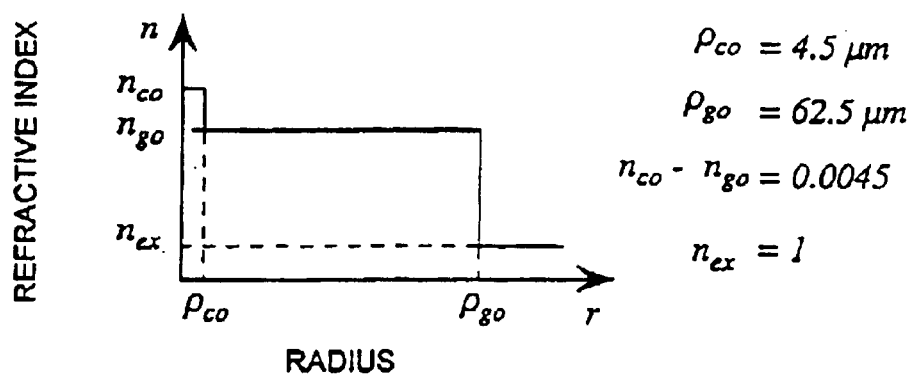
FIG. 1 is a graphic representation of a calculated refractive index profile of a two-fiber coupler of the present invention.
Figure 2:
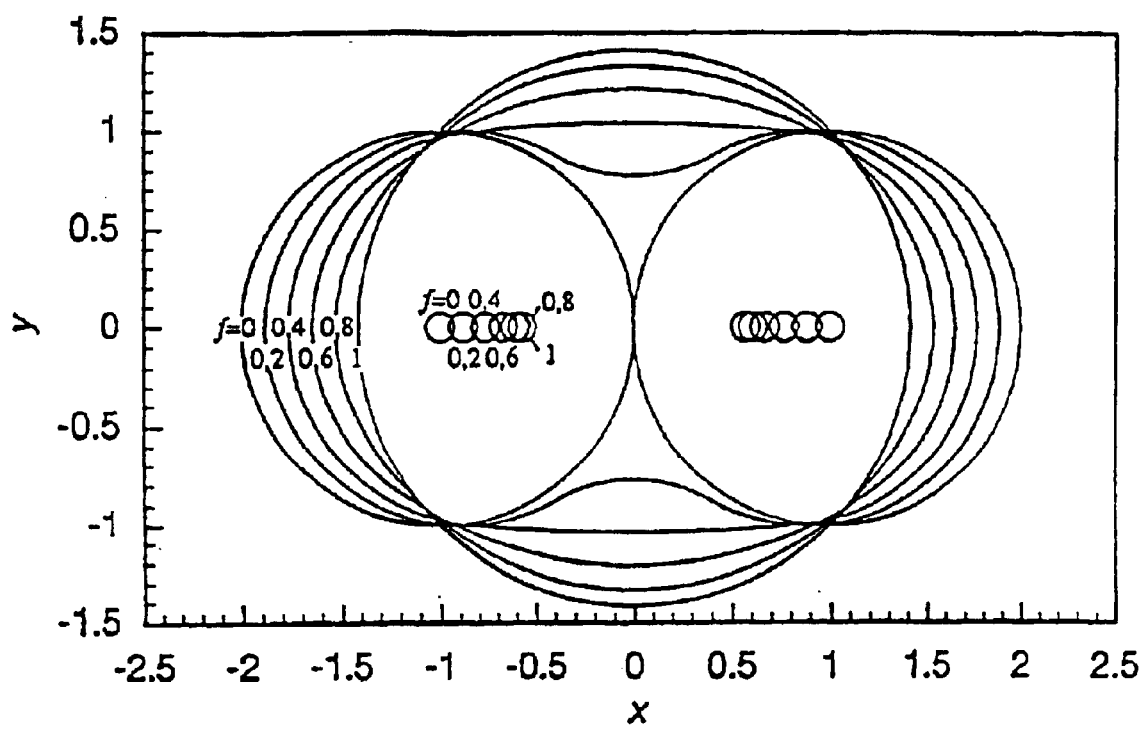
FIG. 2 is a representation of the cross-section of the structure of the coupler of FIG. 1 characterized by the degree of fusion of the fibers.

To make a good fused coupler, one must make a structure that symmetrically excites the two supermodes $LP_{01}$ and $LP_{11}$ of the fused structure, without loss to higher order modes. This can be achieved by choosing a quasi-matched or matched cladding fiber, such as the one with the index profile given in FIG. 1. In FIG. 1, $\rho_{Go}$ is core radius, $\rho_{go}$ is cladding radius, $n_{Go}$ is core refractive index, $n_{go}$ is cladding refractive index and $n_{ex}$ is the exterior refractive index. Corning SMF-28 standard fiber that has a single-mode operation above 1200 nm is suitable for this purpose. Such matched-cladding fibers, when fused together side-by-side, will create a single-cladding structure with two fiber cores. The cross-section of this structure can be characterized by the degree of fusion, as shown in FIG. 2 where x and y represent normalized dimensions with reference to the radius of the fiber and f is the degree of fusion. In this model, the distance between the fiber cores is given by the conservation of area between the core and the outer boundary on the x-axis. In a fiber fused coupler with a single fused region, the degree of fusion along the coupler (along the propagation z-axis) varies from 0 to a value in the middle of the coupler, back to zero at the other end, the fibers being separated at both ends of the coupler.

To understand better the optical response of a coupler, one can numerically model the waveguide properties. The local propagation constants of the 4 supermodes ($LP_{01x}$, $LP_{01y}$, $LP_{11x}$, $LP_{11y}$) depends on the shape of cross-section, the degree of fusion and the reduction ratio defined as the local dimension divided by the initial untapered fiber dimension, and on wavelength. Because the polarizations $\phi_x$ and $\phi_y$ are integrals along the length L of the coupler, and both the degree of fusion and the reduction ratio change along this length, one has to calculate the propagation constants for all the different shapes and sizes possible.

With an appropriate and precise numerical method, one can calculate these values for a coupler composed of two fibers that have the refractive index profile presented in FIG. 1. This is done by first modelling the scalar beat length defined as $z_b = 2\pi/(B_1 - B_2)$. The beat length is presented in FIG. 3, for a wavelength of 1550 nm, as a function of reduction ratio, and for several degrees of fusion as shown in FIG. 2. The beat length is the length at two-modes, in a longitudinally uniform profile, required to accumulate a phase difference of $2\pi$. In other words, it is the length in a coupler that the power takes to go from one fiber to the other and back again. In practical terms this value gives an idea on the length of the coupler. If a coupler is elongated to N cycles, that means that the modes have to accumulate N beat lengths; thus one can deduce, if average profile parameters can be estimated, what the length of the coupling region should be. Reversely, if the degree of fusion and the pull length are known, the approximate dimension of the coupling region can be deduced.

Figure 3:
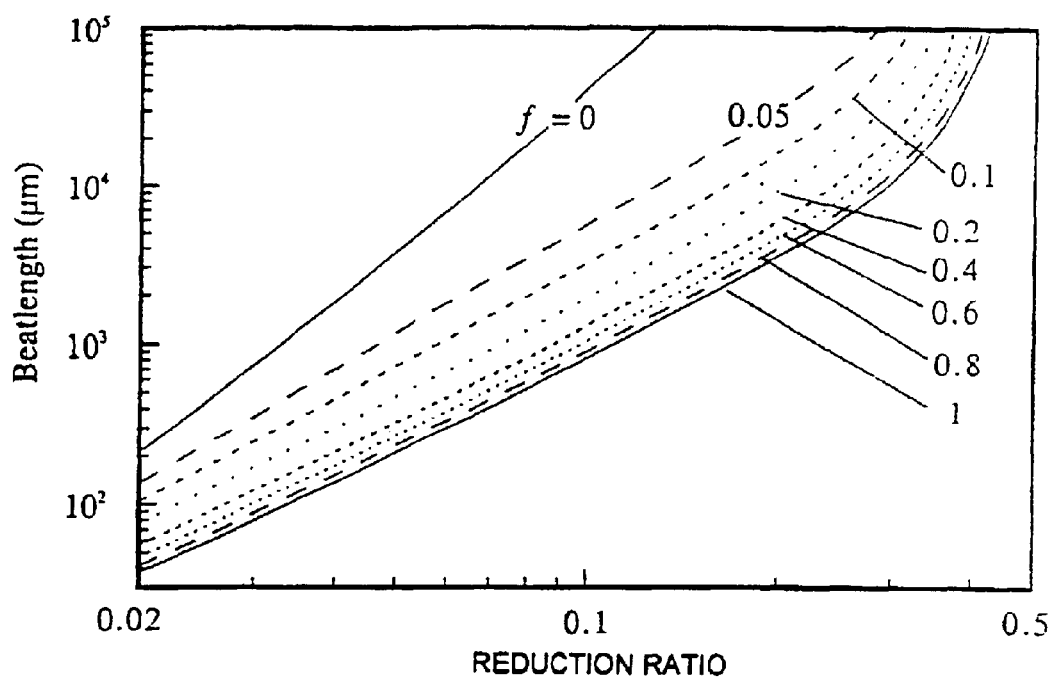
FIG. 3 is a graphic representation of the beat length of the coupler of FIG. 1 for the wavelength of 1550 nm.

In FIG. 3, it is shown that the beat length deceases exponentially with The reduction ratio and with the degree of fusion. In the best case (degree of fusion 1), its value is above 10 cm for a reduction ratio of 0.4. Thus, the fused structure has to be tapered to more than half of its original size in order for any significant coupling to occur. On the other hand, for very a dimensions, the beat length can easily be of the order of 100 μm, making multiple beat length structure a few centimeters long feasible. Also, one can note that there is no big difference between the degree of fusion of 0.6 and above but the variation can be quite large for degrees of fusion below 0.4. All shows that the choice of the degree of fusion and longitudinal profile can greatly affect the length of the coupler that has a given number of beat cycles N.

Figure 4:
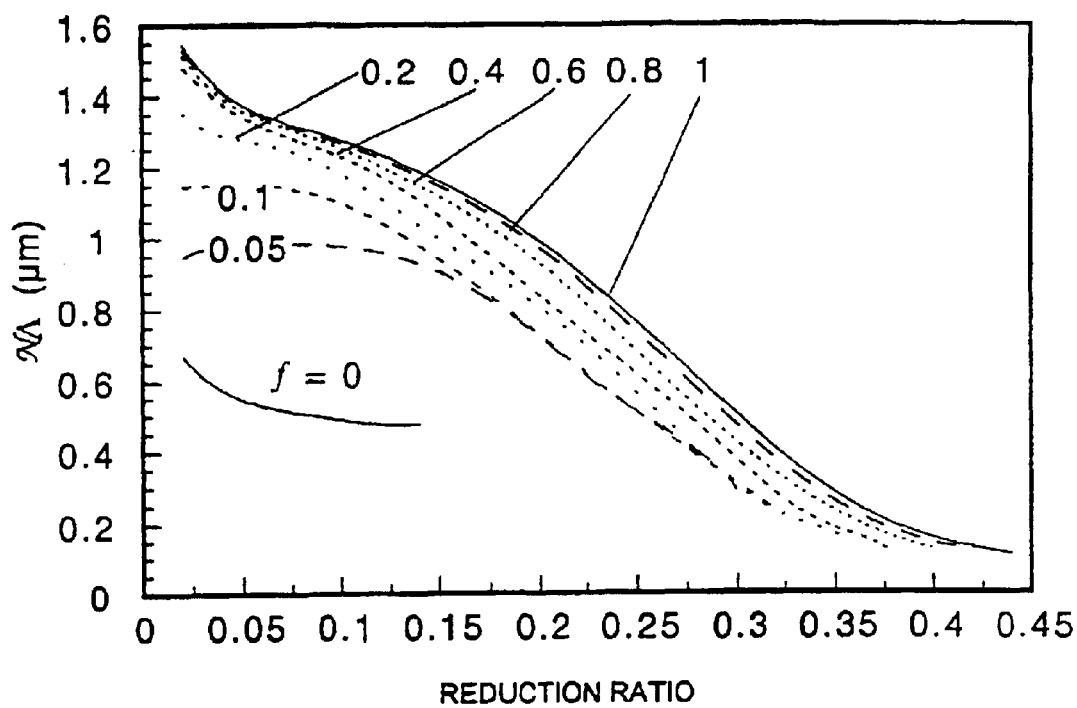
FIG. 4 is a graph illustrating the wavelength dependence of a coupler of N beats as a function of normalized transverse dimension of the tapered structure of the coupler.

As pointed out earlier, the greater the number of cycles N, the narrower the wavelength response. But FIG. 3 does not help in determining the wavelength dependence of the coupler of N beats. For this, the graph plotted in FIG. 4 is useful, wherein the wavelength period Λ times N, is plotted as a function of the same parameter as in FIG. 3. Again, it shows a dependence with size and fusion. The smaller the wavelength of NΛ, the smaller the wavelength spacing for a given N. As can also be seen, the relation of a large N makes a small wavelength spacing. This data shows that, even for a specific number of cycles, the wavelength period can be adjusted by changing the degree of fusion. Reducing the degree of fusion will make the period smaller, but the coupler will be longer. This is also true if the longitudinal profile is changed. A profile with a larger waist will have a smaller period, but will also be longer.

Figure 5:
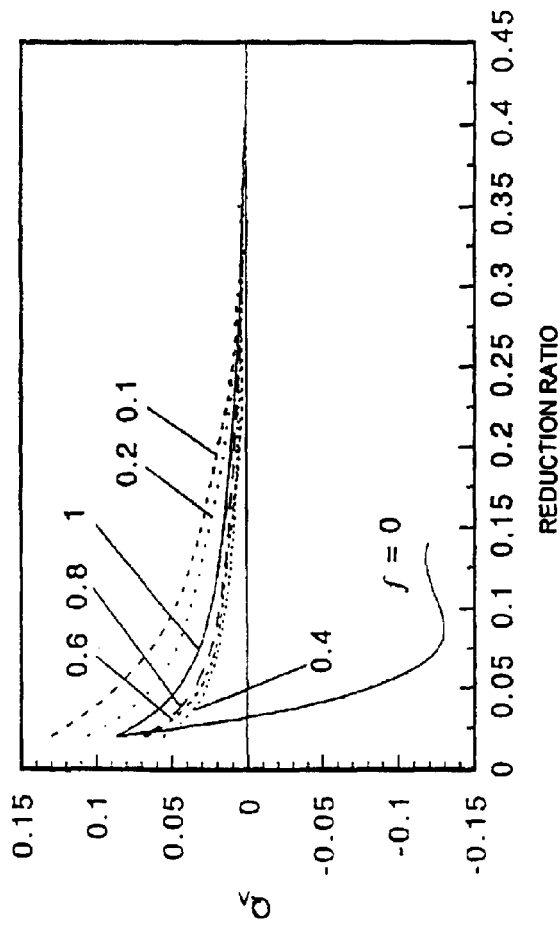
FIG. 5 is a graph showing the ratio of polarization as a function of normalized transverse dimension of the tapered structure of the coupler.
Figure 6:
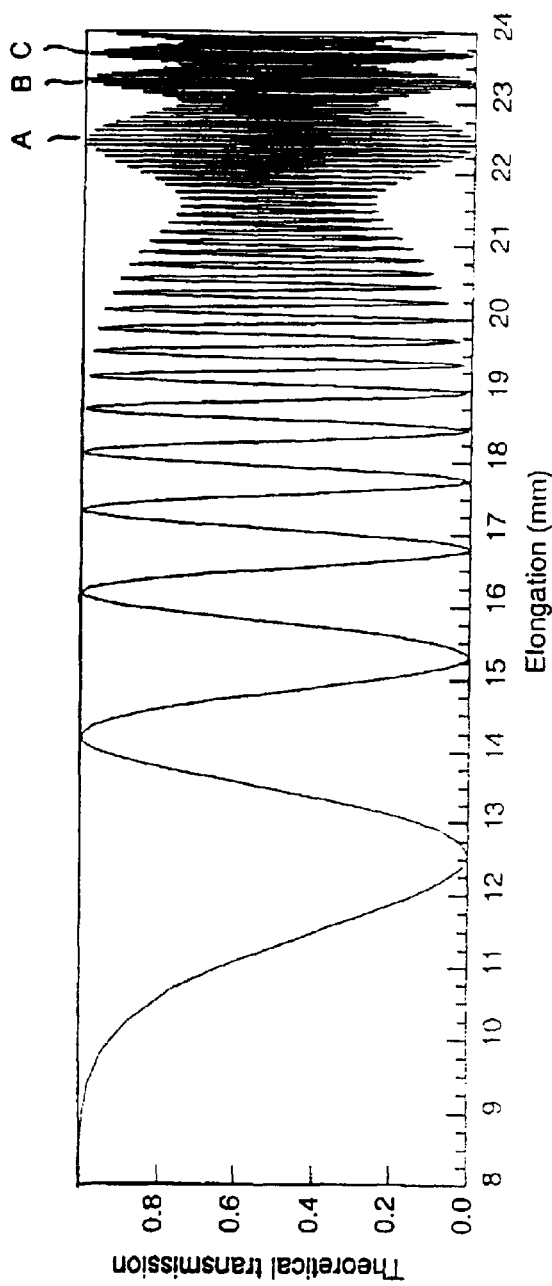
FIG. 6 is a graph illustrating a typical coupler response as a function of elongation with several phase matching points.

The effects observed with FIG. 3 and FIG. 4 can be used to design any multiplexer, because they tell in what way a profile can be changed to obtain a given wavelength period. This can help to tune and fine tune the fabrication parameters. These curves however do not give indication of polarization effects. For that, the graph plotted in FIG. 5 provides the ratio of polarization $Q_{79} = (\Lambda_y - \Lambda_x)/(\Lambda_y + \Lambda_x)$, that gives an idea of the variation of the birefringence as a function of the degree of fusion and the reduction ratio. Firsts one can see that the birefringence is never null, except for couplers that have an extremely small degree of fusion. Furthermore, this occurs only at a single diameter. The main domain of application is in the non-zero degree of fusion for which the birefringence is never zero. In this case, the polarization dependence always increases as the cross-section decreases, and that increase is exponential so that it is very large for smaller reduction ratios. This essentially means that because the coupler cross-section gets smaller as the coupler is elongated, the polarization dependence increases. This also means that the wavelength dependence can be adjusted with the degree of fusion and the shape of the longitudinal profile, as is the case with birefringence. Thus, these parameters can both be used to change both $\phi_x$ and $\phi_y$ as well as their difference. In other words, a smaller waist profile will reduce the length of the coupler but increase the birefringence, as would a degree of fusion of 1 compared to a coupler with a degree of fusion of 0.5. A very small degree of fusion will increase the birefringence even more and a create a much longer coupler. Thus, adjusting the profile will make it possible to phase match the two polarization phases at a given wavelength period. It is important to note that such matching conditions are not unique and several other solutions can be chosen. This is clear if one looks at a typical coupler response as a function of elongation, such as illustrated in FIG. 6, that shows several phase matching points A, B, C. This figure simulates the transmission response in one output branch of the coupler, if monitored with a single wavelength. The beating phenomenon is evident and the proper observation can be made to the effect that the beating between the two polarizations causes the modulation. In this example, the light source is polarized and the launch conditions are such that the contrast of the response at the node where the two polarizations are out of phase is not 0. The point were the contrast is maximum corresponds to a polarization phase matching point .

Figure 7A:
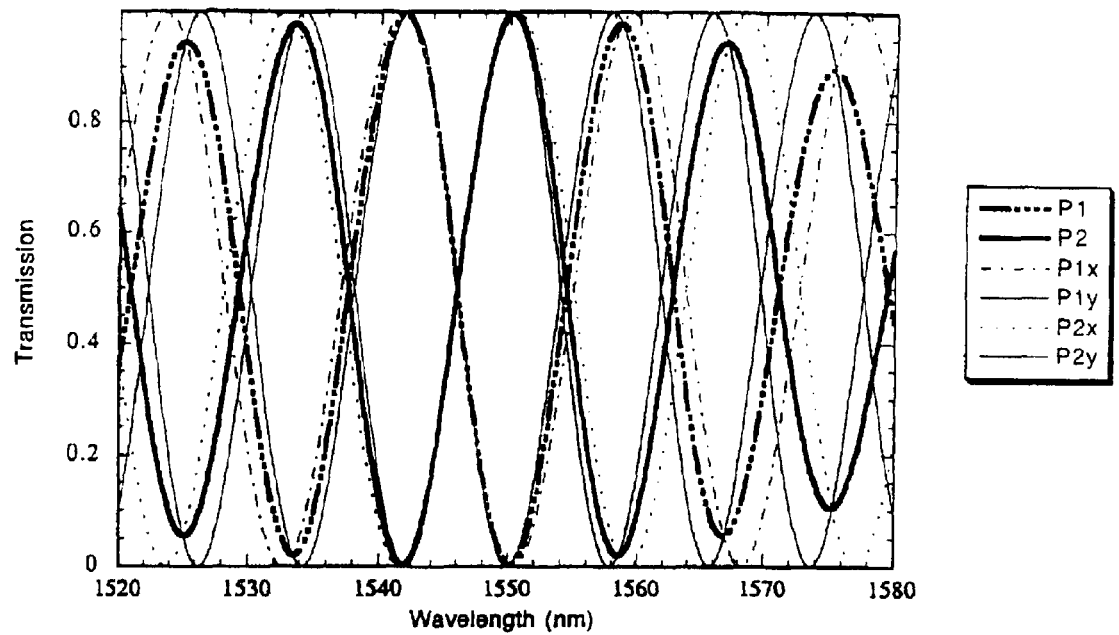
FIG. 7a is a graph showing the variation in coast between two polarization responses, as well as their sum.
Figure 7B:
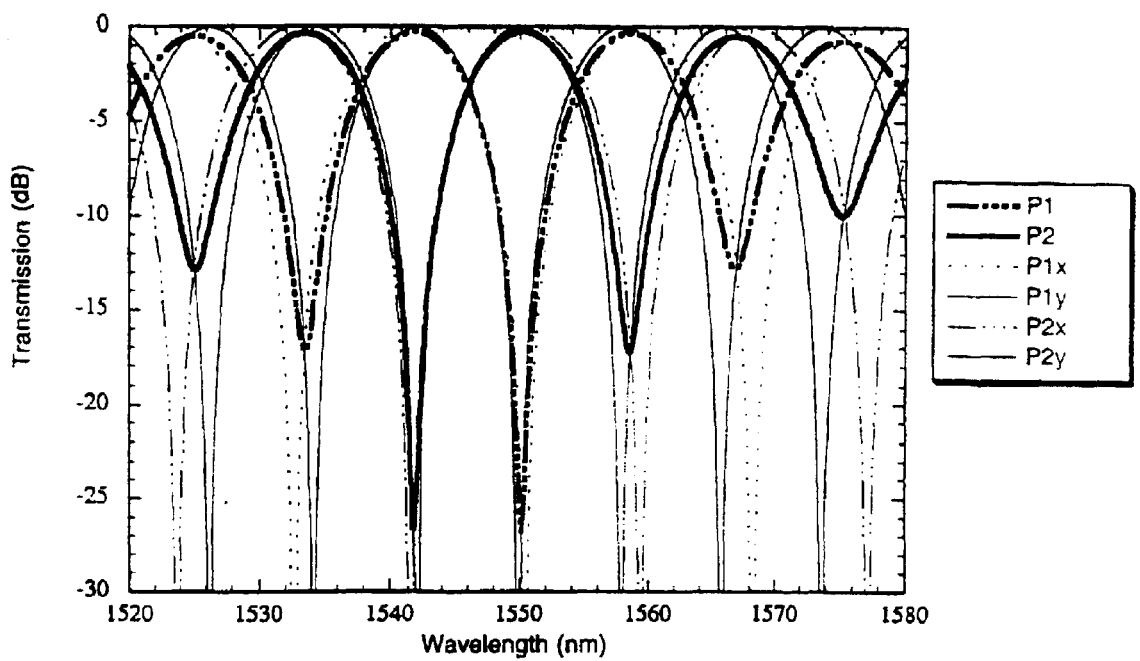
FIG. 7b is a graph showing the same variation in contrast as in FIG. 7a, but plotted in dB.

This variation in contrast is illustrated in FIG. 7a. Here, the two polarization responses $P_1^x$, $P_2^x$ and $P_1^y$, $P_2^y$ as well as their sums $P_1$ and $P_2$ are shown. One can see that the contrast of $P_1$, $P_2$ oscillations is reduced as the two polarizations move out of phase. The contrast is a very good indication of the quality of the coupler. If the contrast is not close to 1, the component will have both excess loss at the extremum point of the transmission and polarization dependent loss in the wavelength operation band around the extremum wavelength. Polarization dependence loss is the difference between the transmission of the two polarization states as shown in FIG. 7b, which is the same as FIG. 7a but plotted in dB. Thus a bad contrast implies both a bad isolation and a bad insertion loss, and a large polarization dependent loss. The parameter that can be measured with most precision is the isolation between $P_1$ and $P_2$, thus to see if the coupler is good, one can look at the peak isolation. If it is greater that 20 dB (99% power transfer) that means that 1% is not coupled, thus creating a 0.03 dB loss in the coupler excess of its excess loss at the peak wavelength. If the isolation is 15 dB, then the insertion loss will be 3% (0.1 dB) greater. If the isolation is 10 dB, then the loss will be more than 0.4 dB. To make a good coupler, one should aim at the isolation to be as large as possible, 20 dB being a target were the loss becomes negligible.

Figure 8:
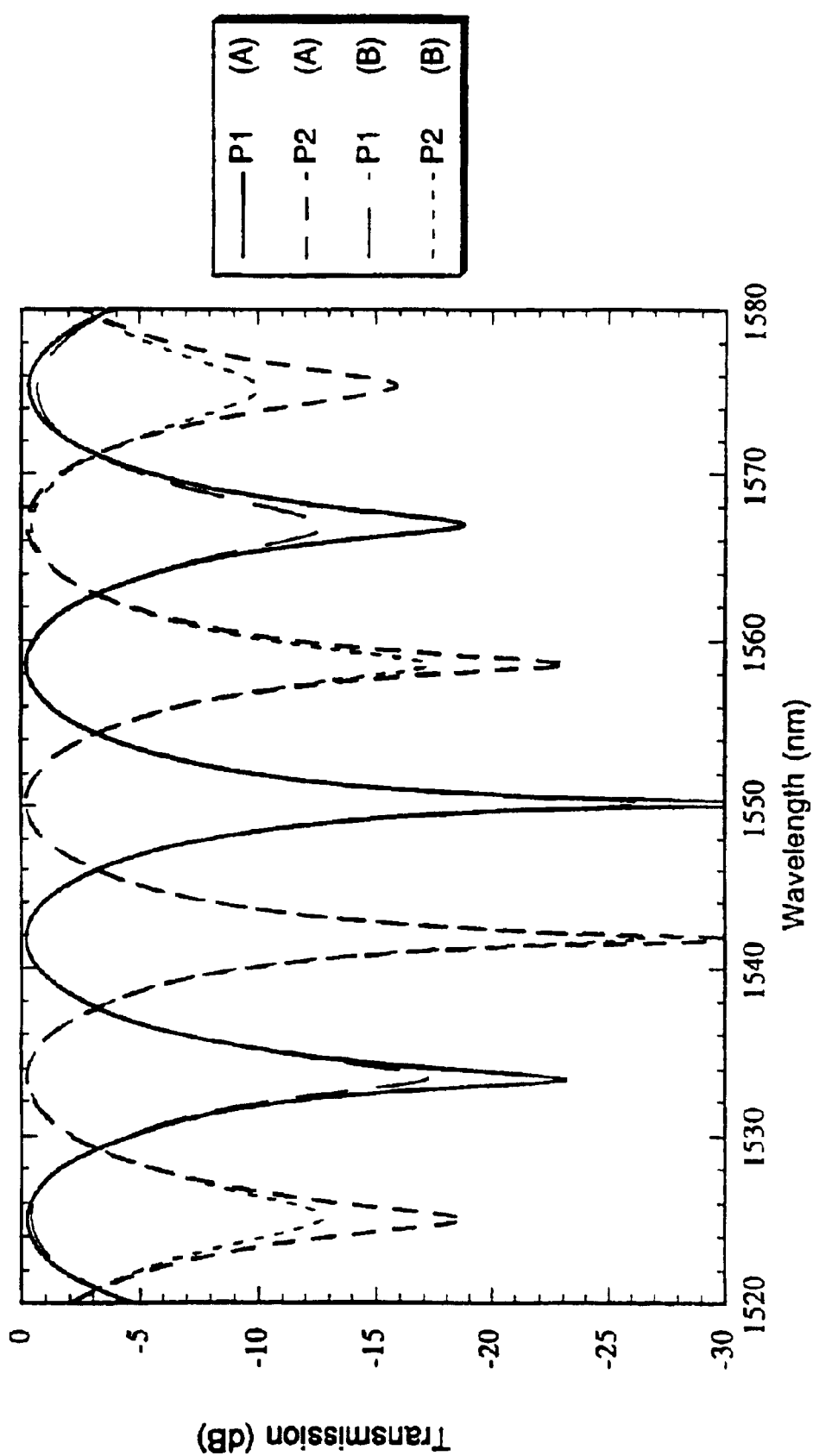
FIG. 8 is a graph showing two polarization beatings as a function of wavelength.

The polarization degradation of the envelope has a direct consequence on the number of wavelengths that can be efficiently multiplexed FIG. 8 shows two polarization beatings as a function of wavelength of two couplers A and B. In the transmission curves corresponding to coupler A, one can see several peaks with more than 20 dB of isolation. Thus, for two wavelengths, several peaks can be selected for proper operation of the multiplexer. As a matter a fact, such a device could easily be used to demultiplex several wavelengths with good performance (up to 4 with more that 20 dB isolation in this example). However, if the birefringence is much larger, such as presented in the transmission curves corresponding to coupler B, the number of wavelengths is more limited In such a case, two wavelengths can be adequately multiplexed with more than 20 dB of isolation and two more, but with 15 dB of isolation. If the polarization dependence is even greater, then multiplexing even two wavelengths becomes difficult. In the two latter cases, and especially in the last one, the positioning of the phase match point between the two multiplexed wavelengths is essential for the proper operation of the multiplexer. One can determine that this is the case if the two isolations at the multiplexed wavelengths are equal. For more than two wavelengths of operation, the rule is to place the phase matched point at half the distance between the smallest and the largest wavelengths to be multiplexed.

Optimally, one wants to always operate the component at the first polarization phase matching point versus elongation because this minimizes any polarization dependent loss, such as point A in FIG. 6 and because, as stated above, the polarization dependence increases as the coupler waist is reduce. Theoretically, one could fabricate a coupler with a desired wavelength period at the first matched point (A in FIG. 6), by making the coupler long enough with a waist large enough. The limiting design aspect then becomes the length of the component. It can be limited by the maximum package dimension or the length of a tapered section that will survive vibrations or other mechanical stresses. Because of this, one often has to make components shorter, thus the birefringence will be larger and one may have to go to the second, third (B, C in FIG. 6), etc. polarization phase matching point to obtain the correct period. Some of the 1.6 nm channel spacing couplers have been made at the $50^{th}$ polarization matching point. To understand the degradation of the performance as one goes to higher order matching points, there is plotted in FIG. 7a and 7b the wavelength response of two couplers that have the same period but which is achieved at the third matching point for the first and at the fourth matching point for the second. Physically, the first coupler is longer by approximately 1 cm than the second. The isolation for the second coupler is worst than for the first coupler. If the degradation is within acceptable parameters, shorter couplers can thus be fabricated.

To design a coupler with predefined properties, one has to operate iteratively on a high performance fabrication setup. The jig must be precise and be able to reproduce a coupler given a set of identical fabrication parameters. To develop and fabricate the multiplexing and demultiplexing couplers of the present invention, a semi-automated fabrication setup was built that relies on computer control and technician intervention to be able to make repeated adjustments in the couplers. The main characteristic of the fabrication setup is that it permits a control of the fusion and the tapering profile enabling the modification of the profile to change and adjust the wavelength characteristics of the coupler from one trial to another. The computer uses a fabrication recipe that is a detailed file containing all the required parameters of fabrication. The operator can stop the process during fabrication to verify the parameters, such as the degree of fusion and the longitudinal profile, and to check for any deviance from the fabrication specifications.

Figure 9:
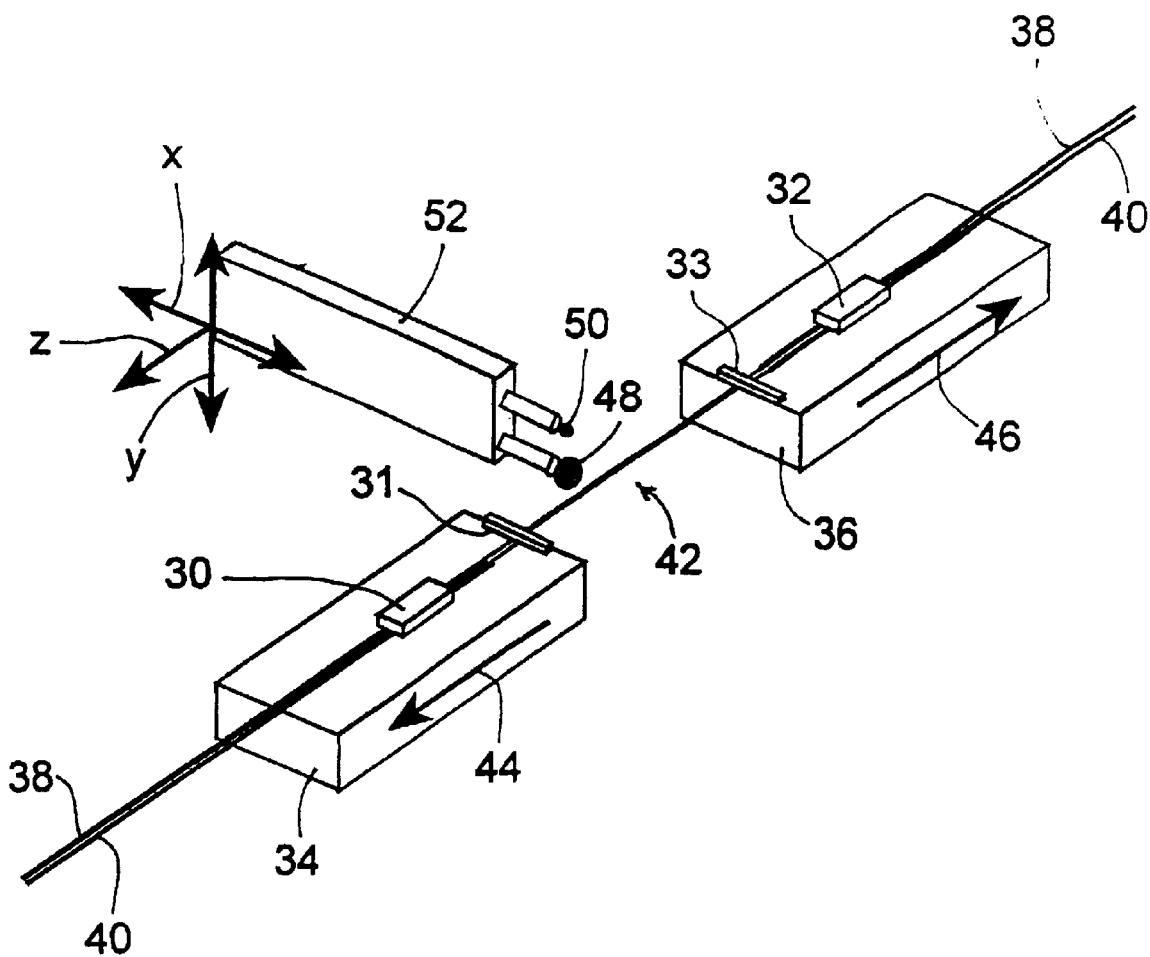
FIG. 9 is a simplified diagram of a fabrication set-up for manufacturing couplers of the present invention.

A simplified diagram of the setup is illustrated in FIG. 9. In this setup, two fiber holders 30 and 32 are mounted on motorized stages 34 and 36 that can pull on fibers 38, 40 to elongate the middle portion 42 where the coupling is produced. These stages 34, 36 have precise positioning resolution, to provide satisfactory control of the coupler length and a control of the pulling speed shown by arrows 44, 46. Typically. the positioning properties arm at 0.1 $\mu$m resolution The fiber holders 30, 32 are such as to maintain the fibers 38, 40 firmly in place so that they will not slip during elongation. For the reproducibility of the process, there are also provided positioning devices 31, 33 which allow reproducible fiber positioning with respect to the heat source 48 and/or heat source 50, so that the longitudinal profile in the coupling region 42 can be reproduced from one fabrication to another and the substrate elongation always produces the same phase shift in the component. The heat source 48, 50 can be a microtorch, a small oven or another heating element, such as a laser, e.g. a $CO_2$ laser that can be focussed on different parts of the taper profile. Such a heat source is mounted on a motorized stage 52 than can be moved in x, y, z directions as shown by arrows x, y, z. In the present example, the heat source 48 was a propane-oxygen microtorch with precise gas flow controllers to make the flame reproducible. The second heat source 50 was a similar torch with a torch tip giving a hotter flame, enabling to accelerate the fusion segment of the fabrication process.

Figure 10:
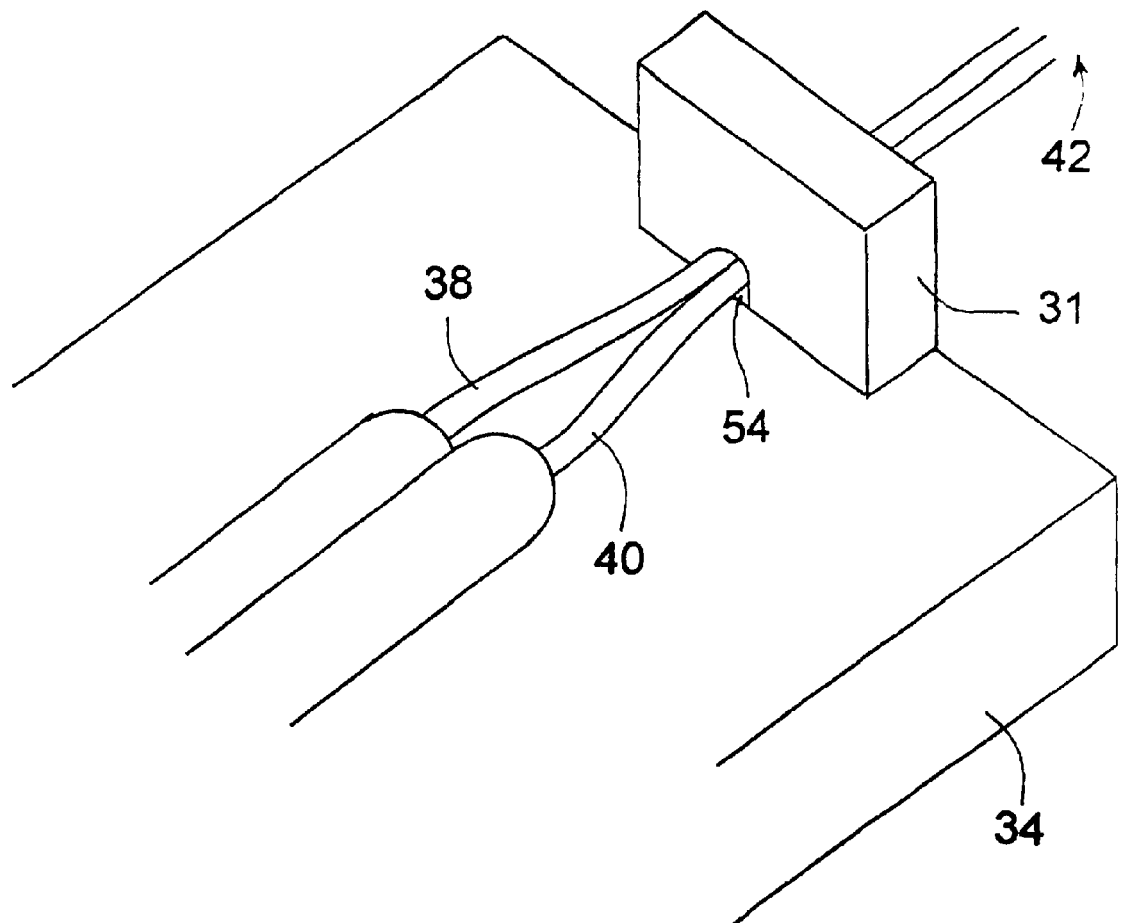
FIG. 10 illustrates the provision of slots to hold the fibers parallel and in contact with each other during their fusion.

Furthermore, as illustrated in FIG. 10, a special mechanical adjustment slot 54 is provided in the positioning device 31, mounted on stage 34, to hold the fibers 38, 40, which have been stripped of their protective jackets, in parallel contact with each other during the fusion of the fibers in the middle zone 42. A similar, corresponding arrangement (not shown) is also provided on stage 36 (FIG. 9) to achieve the required alignment. The fabricating set up is normally enclosed in a protective shell (not shown) which limits undesired air movements around the heated fiber section in the zone 42.

The fabricating procedure is generally as follows:

Fibers 38, 40 are stripped of their protective plastic jackets in the middle region 42 and thoroughly cleaned. The fibers 38, 40 are then placed in the holders 30, 32 in the area where they are still provided with the plastic jackets and are clamped in these holders.

The fibers 38, 40 are properly aligned with each other in the middle region 40 with the use of positioning devices 31, 33 provided with suitable alignment slots, such as 54, so that they are held in parallel contact with each other.

A computer program that controls both the torches' positioning stage 52 and the fiber holders 34, 36 is used to first bring the hotter heat source 50 close to the fibers in the middle zone 42. To produce a coupler, the fibers are fused with a given fusion profile, usually a few millimeters long. Once the fusion is realized, the torch 50 is removed and the degree of fusion is checked to insure that the proper profile has been realized. This fusion profile is one of the parameters that needs to be adjusted to match both the wavelength properties and the polarization properties of the coupler. Because the fiber is not tapered during the fusion step, one can measure the width of the fused region by looking at the two optical fibers from an axis orthogonal to the fiber plane. As illustrated in FIG. 2, the width is proportional to the degree of fusion. The next step is the elongation of the fuse fibers. For this, the flame of torch 48 is used. It is less hot and wider than the flame of the torch 50 used for the fusion, and can be brought close enough to the fibers to make them ductile. The motors of the motorized stages 34, 36 then pull the fibers as shown by arrows 44, 46, creating a fiber taper profile. This profile will depend on the flame heat pattern and position along the length of the taper and on the pulling speed. It is important to realize an adiabatic profile, that is, a profile that has a taper slope small enough to produce any coupling with higher order optical modes, which would in the end translate into undesired loss. To achieve wide enough flame, one can brush the torch back and forth along the length to simulate a larger flame. One important point in profile design is that the brush width can be varied live during the elongation and this will change the profile shape and thus the polarization and wavelength properties. The elongation process is stopped when a match point between the wavelength period and phase is achieved. This can be realized by monitoring the evolution of the wavelength response.

Figure 11:
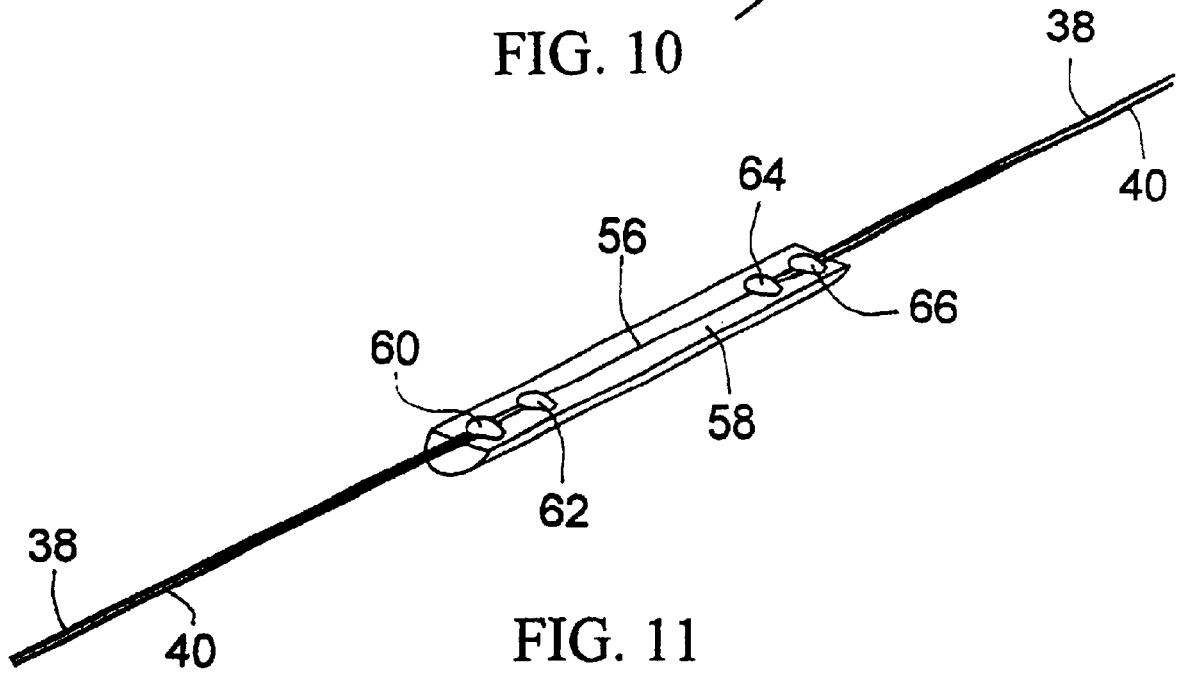
FIG. 11 illustrates the packaging of the coupler.

It should be noted however, that usually one cannot precisely determine the match point during the elongation process because the heat of the flame changes the index of the glass and thus the phase of the coupler, which should be measured at room temperature. As stated earlier, the elongation process can be interrupted to insure a proper measurement of the evolution of the wavelength properties. During this interruption, the torch is removed and the pulling stopped so that optical properties can be measured at that point and the evolution of the wavelength period as a function of elongation can thus be noted. When the wavelength properties are very close to the target, one can use very short pulls (sometimes only a few microns) after each stoppage, by reheating the coupler for a very short time. This enables micro-adjustment, making the wavelength response shift only a few tenths of nm. As previously mentioned, the final properties may be adjusted using a cold pull. After the predetermined wavelength period is obtained, the coupler is secured to a suitable substrate as shown in FIG. 11. In this figure, the coupler 56 is secured to a rigid substrate 58 by adhesive bonds 60, 62, 64, 68. The substrate 58 is then inserted into a protective tube (not shown) or otherwise packaged.

If done randomly, it would be pure luck to stumble on a coupler fabrication recipe that would provide the polarization phase match with the desired wavelength response, even if it were not the first matched point. One cam however, easily learn from previous trials to determine the proper fabrication parameter.

When starting from scratch, the first thing is to determine the limit of adiabaticity of the slope of the coupler. One must first start with the fusion process. If the fusion is too localised, the deformation of the fiber cores will be nonadiabatic and cause insertion loss. Even though its loss may be reduced during tapering, it is better to realize a fusion with larger flame or to brush the fusion flame to reduce the fusion slopes and achieve an adiabatic, lossless fusion. If the design requires a short coupler length, a high degree of fusion, which also corresponds to a smaller polarization dependence, is preferable for the adiabaticity trials. After the fusion, the tapering is done with a given flame and brush width. If coupling without loss is observed, then the coupler is adiabatic. One then makes a second trial with a smaller brush width. If the coupler is adiabatic again, the trial process is repeated until some loss is observed. The last width that is lossless makes a profile which is at the adiabaticity limit and will correspond in the design to the minimum brush width. With the SMF-28 fiber, this brush width was found to be approximately 6 nm for a 0.8 nm flame. It is important to note that this minimum brush width is important only in the first 10 nm of elongation. At such an elongation, the waist corresponds approximately to the point of the core to cladding mode transition, where the adiabaticity criteria is the most restrictive. After that point, where some coupling has occurred, the brush width can be progressively reduced without any loss penalties.

Because a shortest possible coupler is usually desired, one starts making a coupler using the minimum adiabatic limit and pulls the coupler though several polarization cycles. At each cycle, the wavelength period is noted for each matched point. One thus knows that using the same recipes, the indicated periods will be achieved for the noted polarization matched points. As stated earlier, this provides little chance of getting the exact desired period. However, such period will be between two of the noted periods. One can thus change the degree of fusion and profile to make the match. If the profile can be made longer, then the previous match point period can be shifted toward the target by increasing the brush width. If the coupler is to long, then the following polarization matched point can be shifted by decreasing, in some parts of the recipe, the brush width. This can be repeated for different recipes, giving a matrix of period polarization matched points as shown in FIGS. 12 to 15. The several different recipes can achieve the same properties, in the same way that different elongations can achieve the same wavelength periods.

The following examples will illustrate the above described points:

EXAMPLE 1

Figure 12:
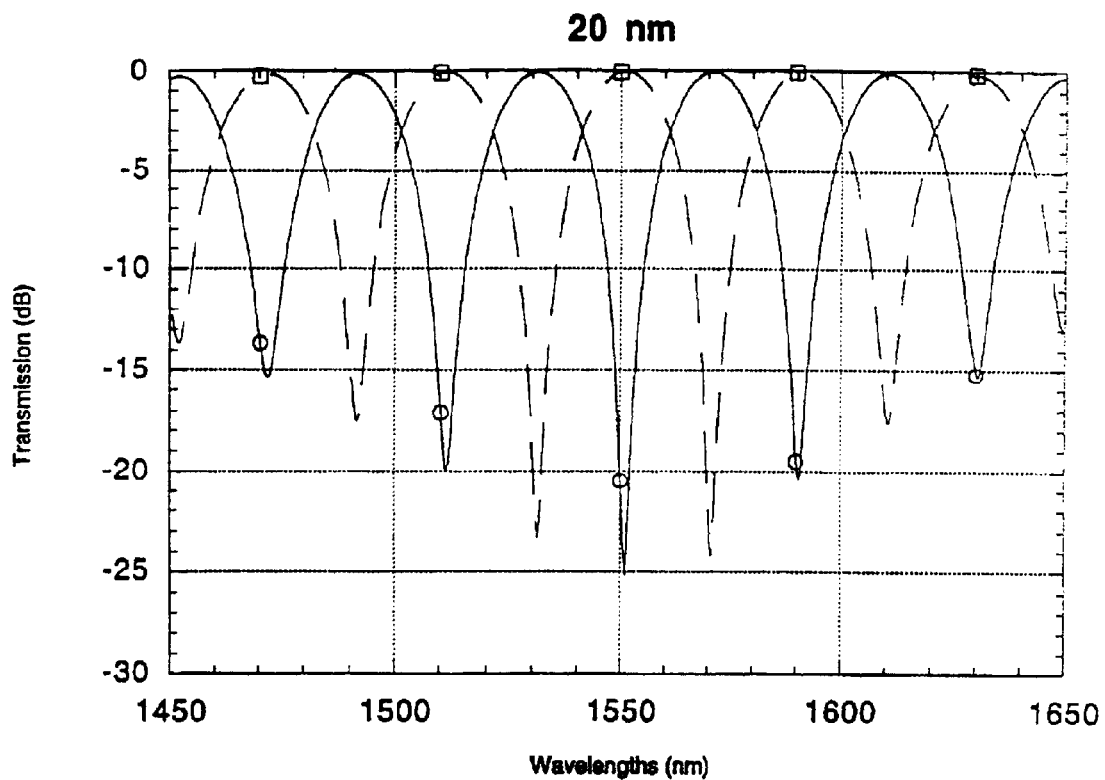
FIG. 12 is a graph showing an actual wavelength response of a 20 nm multiplexer.

The multiplexer of this example was produced to multiplex two wavelengths at 20 nm spacing (between 1530 nm and 1550 nm). In doing the first trial, it was found that the first match point period was 22 nm and the second match point period was 17 nm for a constant 6 nm brush width. Increase of the brush width to 7 mm after 25 mm elongation was made, thereby shifting the first match point period to 20 nm. The final wavelength response is shown in FIG. 12. In this example, as seen in FIG. 12, there are five wavelengths that can be multiplexed or demultiplexed with 20 dB or more of isolation.

EXAMPLE 2

Figure 13:
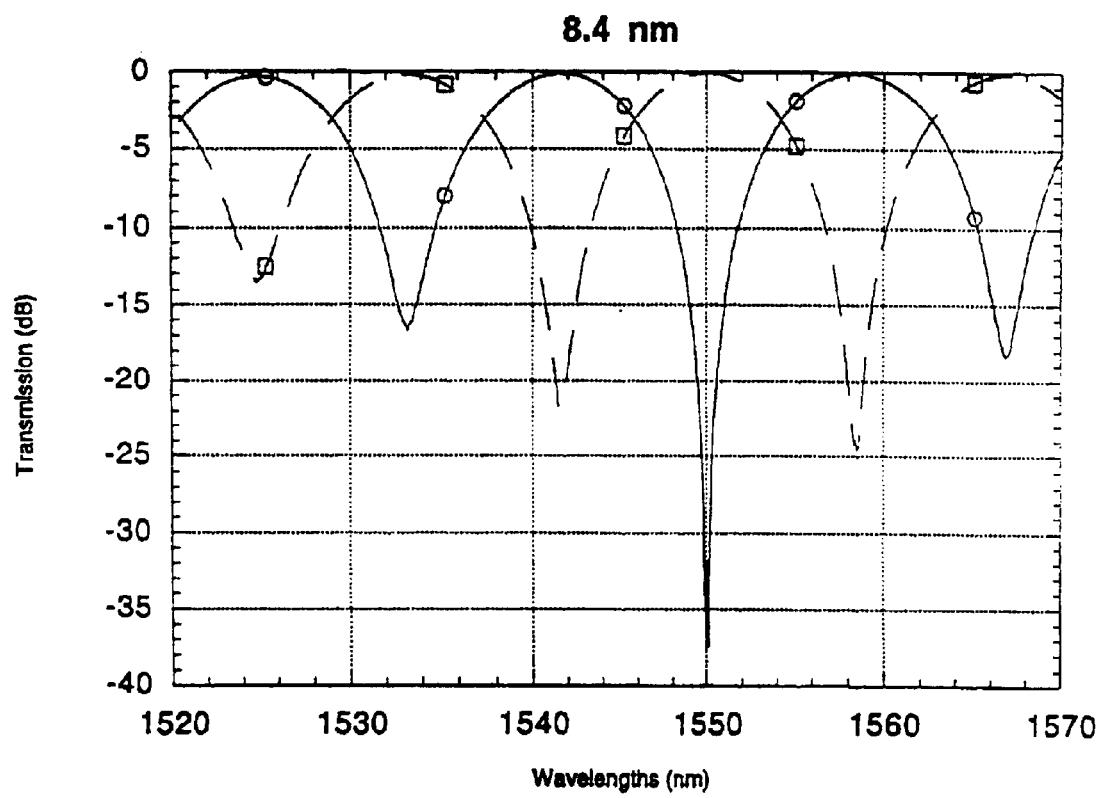
FIG. 13 is a graph showing an actual wavelength response of an 8.4 nm multiplexer.

In this example, a coupler with 8.4 nm spacing was produced (between 1550 nm and 1558.4 nm). In the first trial, the spacing of 8.4 nm is achieved between the third and fourth matched points. Similarly, increasing the brush width as described in Example 1, it is possible to shift the third match point to the desired value. Moreover, by increasing the brush width to 10 mm, it was possible to shift the first match point to 8.4 nm. However, this makes the coupler too long. If a shorter coupler is desired, the brush width can be reduced to 4 mm after 25 mm elongation, thus shifting the fourth matched point to 8.4 nm. The final wavelength response is shown in FIG. 13.

If the coupler is intended to operate only at 2 wavelengths, this does not present a problem, because the solution is good for several wavelengths. However, if it is desired to make the coupler function at more than 4 wavelengths, the isolation degrades too much by going to the fourth matched point It is better then to use the second or even the first match point to realize such coupler, even if it must be longer in size.

EXAMPLE 3

Figure 14:
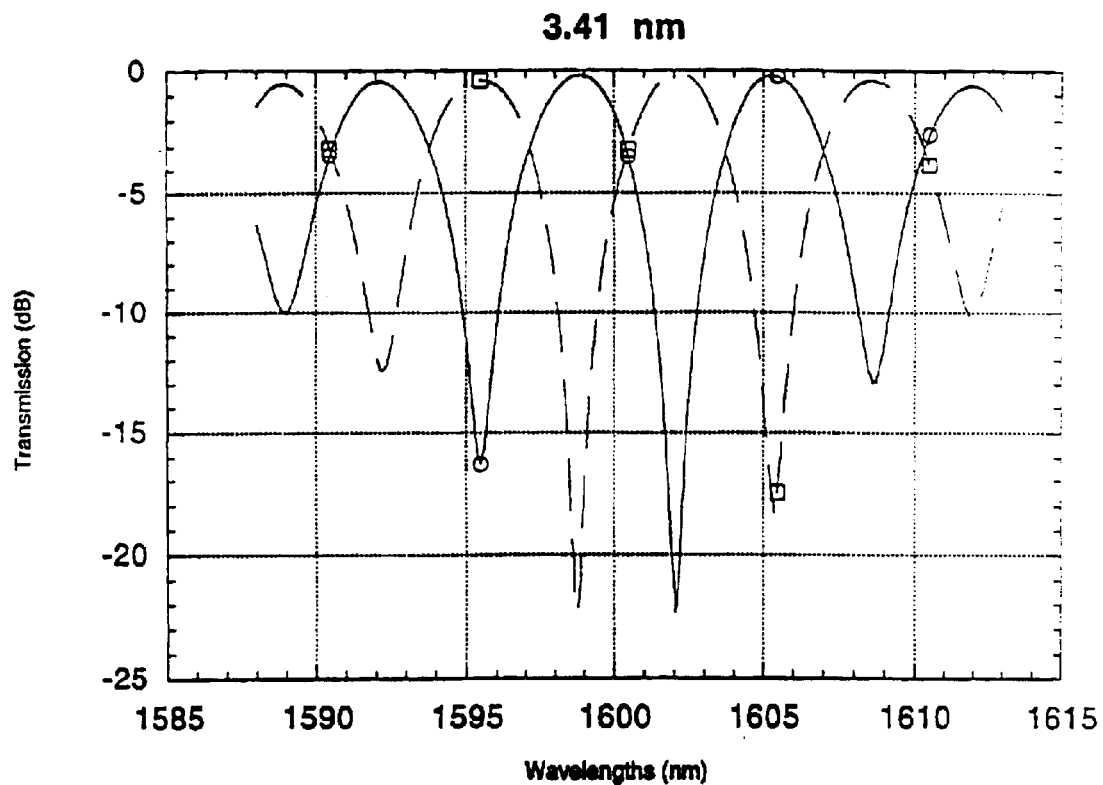
FIG. 14 is a graph showing an actual wavelength response of a 3.2 nm multiplexer.

In this example, a coupler with 3.41 nm spacing was produced (between 1598.60 nm and 1602.01 nm). The response for this coupler is shown in FIG. 14. In such couplers, the isolation properties degrade considerably bemuse the waist gets smaller and the polarization effect gets larger. It is possible to achieve 20 dB isolation even when using the $15^{th}$ match point This is possible by brushing very wide after the diameter has been reduced significantly. The length of the coupler becomes more than 60 mm If a shorter coupler is desired, the idea is to reduce the cross-section dimension to achieve a small beat length, but then to brush very wide or in increasing incremental fashion to keep the waist as large as possible. If the waist is not further reduced, then the polarization degradation will not increase. The period will diminish as elongation proceeds from matched point to matched point, but the isolation between peaks will not change.

EXAMPLE 4

Figure 15:
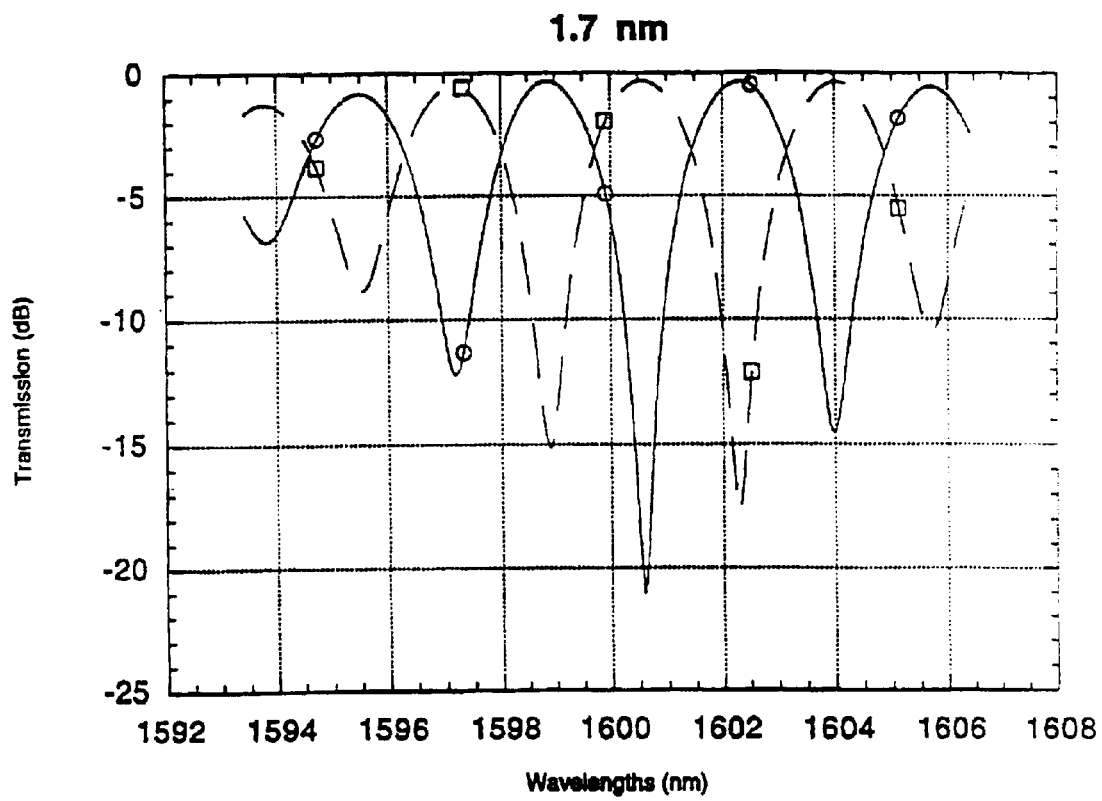
FIG. 15 is a graph showing an actual wavelength response of a 1.6 nm multiplexer.

A 1.7 nm WDM coupler was made (between 1600.7 nm and 1602.4 nm) having a length of less than 10 mm. The response is shown in FIG. 15. The same principle as described above was used. Even then, however, the isolation is around 14 dB for 4 wavelengths as compared to about 17 dB for the 3.41 nm spacing.

The principles illustrated by the above examples can be applied to other wavelengths, other spacings and other fibers. For example, around 980 nm, a different fiber is used. It has 6 $\mu$m diameter core instead of 9 $\mu$m diameter of the SMF-28 fiber used in the above examples.

Because of the wavelength, the first match point period is close to 10 nm instead of 20 nm as in Example 1 above. Thus, a very narrow spacing will be obtained for the same match point number and the coupler will be shorter. The methodology and adjustments described above would also apply to this situation.

As already mentioned earlier, another parameter can be changed to optimize the wavelength spacing, namely the degree of fusion between the fibers. Although is can be used for any wavelength spacing, it is particularly useful for optimizing large spacings, above 20 nm, because they require an increase in the polarization dependance, the first match point being normally around 20 nm. Using the same elongation recipe as described in Example 1 above, and illustrated in FIG. 12, the first matched point period can be shifted to 30 nm by reducing the degree of fusion to 0.1. Even larger spacing can be realized by also reducing the brush width, which makes the waist smaller and thus the polarization dependence larger.

The invention is not limited to the specific embodiments and examples described above. Many modifications obvious to those skilled in the at may be made without departing from the spirit of the invention and the scope of the following claims.

What is claimed is:

1. Method of fabrication of multiplexing and demultiplexing single-mode fiber optic couplers which comprises:
    (a) aligning two single-mode fibers, which have been stripped of their protective plastic jackets and cleaned, so that they are held in contact with each other;
    (b) fusing said fibers in a fusing zone, using a suitable heat source to achieve a predetermined fusion profile; and
    (c) in a separate step, elongating the fused fibers by controllably pulling them longitudinally while heating them with a suitable heat source so as to create a coupling zone with an adiabatic profile, and stopping the elongation process when a match point between wavelength period and polarization phase is achieved so as to obtain simultaneously a predetermined wavelength spacing and a required polarization phase match, thereby producing the desired multiplexing or demultiplexing coupler.

2. Method according to claim 1, further comprising interrupting and resuming the elongation of the fused fibers, while monitoring the wavelength response during each interruption, so as to achieve a precise match point between the wavelength period and the polarization phase.

3. Method according to claim 2, wherein the interruption is done by removing the heat source, stopping the pulling of the fused fibers and measuring the evolution of the wavelength period at that point and then reheating and re-pulling the fibers until a desired wavelength response is obtained.

4. Method according to claim 3, wherein when the wavelength period is close to the desired target, very short re-heating periods and pulls are made to produce the precise wavelength response required to achieve the polarization phase match point, which may be any point in a series of match points, depending on the desired length of the coupler.

5. Method according to claim 4, wherein, if the polarization phase match point is slightly overshot, it is brought back by a final cold pull, without re-heating the fibers.

6. Method according to claim 1, which comprises aligning of the two fibers in parallel alignment without crossing or twisting said fibers with each other.

7. Method according to claim 6, wherein the parallel alignment of the fibers is achieved by providing a mechanical aligning slot in fiber positioning devices at each end of the fusing zone.

8. Method according to claim 1, wherein the fibers are fused using a heat source which is hotter than the heat source used for elongation.

9. Method according to claim 1, wherein by adjusting the degree of fusion between the fibers, a desired shift in the polarization match point is produced.

10. Method according to claim 9, wherein by realizing the fusion with a large flame, the fusion slopes are reduced to achieve an adiabatic, lossless fusion.

11. Method according to claim 9, wherein by brushing the fibers with a fusion flame, the fusion slopes are reduced to achieve an adiabatic, lossless fusion.

12. Method according to claim 9, wherein by reducing the degree of fusion, a larger polarization match point spacing is realized.

13. Method according to claim 1, wherein, when elongating the fused fibers, the heating is carried out by a flame on a torch which can be brushed along the length of the coupling zone to stimulate a larger flame, and by varying the brush width during the elongation, the profile shape and thus the polarization and wavelength properties are modified as desired.

14. Method according to claim 1, wherein the two single-mode fibers are identical.

15. Method according to claim 1, wherein the two single-mode fibers are dissimilar.

16. Method according to claim 1, wherein more than two fibers are used to produce multiple wavelength couplers.

17. Method according to claim 1, wherein the obtained coupler is secured to a suitable substrate and packaged.

18. Method according to claim 1, wherein the fusing and elongation are controlled by a computer program providing a repeatable recipe for these operations.

19. A multiplexing or demultiplexing single mode fiber optic coupler having a narrow channel spacing of a minimum of 0.4 $\mu$m, produced in accordance with claim 1.

* * * * *